United States Patent
Belgaied et al.

(10) Patent No.: US 7,373,504 B1
(45) Date of Patent: May 13, 2008

(54) KERNEL-LEVEL CRYPTOGRAPHIC KERNEL INTERFACE

(75) Inventors: Kais Belgaied, Toronto (CA); Mark C. Powers, Park City, UT (US); Bhargava K. Yenduri, Santa Clara, CA (US); Nicolas G. Droux, San Francisco, CA (US); Paul J. Sangster, San Jose, CA (US); Darren J. Moffat, Campbell, CA (US); Gary W. Winiger, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 804 days.

(21) Appl. No.: 10/803,341

(22) Filed: Mar. 18, 2004

(51) Int. Cl.
*H04L 9/00* (2006.01)

(52) U.S. Cl. .................. 713/164; 713/190; 713/191; 713/192

(58) Field of Classification Search ......... 713/190–192
See application file for complete search history.

(56) References Cited

U.S. PATENT DOCUMENTS 5,301,331 A * 4/1994 Ueno et al. ............... 710/260
7,120,799 B2 * 10/2006 Leung et al. .............. 713/189

* cited by examiner

*Primary Examiner*—Gilberto Barron, Jr.
*Assistant Examiner*—Jung Kim
(74) *Attorney, Agent, or Firm*—Osha Liang LLP (57) ABSTRACT

A method for performing a cryptographic function including calling into an encryption framework to perform the cryptographic function, wherein calling into the encryption framework comprises sending a request to perform the cryptographic function from a kernel consumer, and processing the request and returning the result to the kernel consumer, wherein processing the request comprises determining whether the request is synchronous or asynchronous, and determining which cryptographic provider to use to perform the cryptographic function.

55 Claims, 3 Drawing Sheets

KERNEL-LEVEL CRYPTOGRAPHIC KERNEL INTERFACE

BACKGROUND

The information age has radically changed the way companies do business. Over the last two decades, networks have continually expanded through wide area network (WAN) to WAN connections and Internet-based network extensions, such as portals and corporate Web sites. Companies have implemented private networks to securely communicate with key partners, with customers worldwide via e-commerce sites, and with employees accessing corporate data across Local Area Networks (LANs), WANs, and remote access connections. As a result, companies must ensure the security of ever expanding network boundaries. At the same time, Information Technology departments need security implementations that do not slow down system throughput. (See, Enhanced Cryptography for Enhanced Security, Sun® Microsystems, 2003).

One approach to create secure network communication involves cryptography, where data is scrambled, or encrypted, for secure transfer across the network. Cryptography can be employed, for example, using the IPsec (Internet Protocol security) protocol to securely transfer data between computers across the network. Cryptography is also commonly employed using the SSL (Secure Sockets Layer) protocol to encrypt Web-based traffic, such as data sent over e-commerce sites, portals, or secure mail servers.

The software-based cryptographic mechanisms (e.g., MD5, 3DES, etc.) used in conjunction with the aforementioned protocols (e.g., SSL) are typically implemented within applications (at both the user-level and kernel-level) using an internal implementation of the cryptographic mechanism that the application or kernel module supports.

While cryptography can help increase the security of communications across a network, it unfortunately can degrade secure application performance because compute-intensive cryptographic operations such as operations used in SSL session establishment and bulk encryption/decryption use software based cryptographic mechanisms. One method of countering this effect is to off-load cryptography functions from the system processor to specialized hardware devices (i.e., hardware cryptographic accelerators).

SUMMARY

In general, in one aspect, the invention relates to a method for performing a cryptographic function comprising calling into an encryption framework to perform the cryptographic function, wherein calling into the encryption framework comprises sending a request to perform the cryptographic function from a kernel consumer, and processing the request and returning the result to the kernel consumer, wherein processing the request comprises determining whether the request is synchronous or asynchronous, and determining which cryptographic provider to use to perform the cryptographic function.

In general, in one aspect, the invention relates to a method for performing a cryptographic function comprising obtaining a request from a kernel consumer by a kernel, performing the cryptographic function in a kernel consumer context if the request is synchronous, queuing the request if the request is asynchronous and the kernel consumer indicated to queue the request, performing the cryptographic function and returning the result to the kernel consumer after a period of time if the request was queued, and performing the cryptographic function and returning the result to the request to the kernel consumer if the request is asynchronous, the kernel consumer indicated not to queue the request, and the request does not need to be queued.

In general, in one aspect, the invention relates to a system for performing a cryptographic function, comprising a kernel consumer configured to request the cryptographic function, and a kernel comprising a cryptographic provider configured to perform the cryptographic function, and an encryption framework comprising a kernel interface configured to interface between the encryption framework and the kernel consumer, and a provider interface configured to interface between the cryptographic provider and the kernel interface, wherein the encryption framework is configured to receive and schedule synchronous and asynchronous requests from the kernel consumer.

In general, in one aspect, the invention relates to a system for performing a plurality of cryptographic functions in a kernel, comprising a kernel consumer configured to request one of the plurality of cryptographic functions, a plurality of cryptographic providers each configured to perform at least one of the plurality of cryptographic functions, and an encryption framework comprising a kernel interface configured to interface between the encryption framework and the kernel consumer, and a provider interface configured to interface between the plurality of cryptographic providers and the kernel interface, wherein the encryption framework is configured to receive and schedule synchronous and asynchronous requests from the kernel consumer.

In general, in one aspect, the invention relates to a network system having a plurality of nodes, comprising a kernel consumer configured to request a cryptographic function, a kernel comprising a cryptographic provider configured to perform the cryptographic function, and an encryption framework comprising a kernel interface configured to interface between the encryption framework and the kernel consumer, and a provider interface operatively connected to the kernel interface configured to interface between the cryptographic provider and the kernel interface, wherein the encryption framework is configured to receive and schedule synchronous and asynchronous requests from the kernel consumer, wherein the kernel consumer executes on any node of the plurality of nodes, wherein the cryptographic provider executes on any node of the plurality of nodes, wherein the provider interface executes on any of the plurality of nodes, and wherein the kernel interface executes on any node of the plurality of nodes.

Other aspects of embodiments of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, the invention relates to a method and apparatus for performing cryptographic functions in the kernel. In one or more embodiments, this may involve supporting requests from kernel consumers to perform cryptographic functions. In general, embodiments of the invention support requests from kernel consumers by providing an encryption framework allowing kernel consumers to interact with cryptographic providers (i.e., a hardware device driver or a software module offering cryptographic services). More specifically, the encryption framework, in one embodiment of the invention, includes a kernel interface and a provider interface. In one embodiment of the invention, the kernel interface provides a common entry point for kernel consumer to access the encryption framework. Further, in one embodiment of the invention, the provider interface provides a common entry point for all cryptographic providers.

In general, embodiments of the invention provide a method for performing a cryptographic function. In some embodiments of the invention, a kernel consumer calls into an encryption framework and requests that the encryption framework perform the cryptographic function. In some embodiments of the invention, the encryption framework processes the request and returns the result to the kernel consumer, wherein processing the request comprises determining whether the request is synchronous or asynchronous, and determining which cryptographic provider to use to perform the cryptographic function.

In general, embodiments of the invention relate to a method for performing a cryptographic function. In some embodiments of the invention, a kernel obtains requests from a kernel consumer. The kernel subsequently proceeds to process the requests. In one embodiment of the invention, the kernel processes the request by performing the cryptographic function in the kernel consumer context if the request is synchronous. In such cases, the cryptographic function may be performed and the result returned to the kernel consumer. Alternatively, the request may be queued if the request is asynchronous and the kernel consumer indicated to queue the request. In such cases the cryptographic function may be performed and the result returned to the kernel consumer after a period of time if the request was queued. Further, in some embodiments of the invention, an asynchronous request may be processed and the result returned to the consumer if the kernel consumer indicated not to queue the request, and the request does not need to be queued.

In general, embodiments of the invention relate to a system for performing a cryptographic function. In some embodiments of the invention, the system may include a kernel consumer configured to request the cryptographic function and a kernel. In some embodiments of the invention, the kernel includes a cryptographic provider configured to perform the cryptographic function, and an encryption framework. In some embodiments of the invention, the encryption framework includes a kernel interface configured to interface between the encryption framework and the kernel consumer, and a provider interface configured to interface between the cryptographic provider and the kernel interface, wherein the encryption framework is configured to receive and schedule synchronous and asynchronous requests from the kernel consumer.

Figure 1:
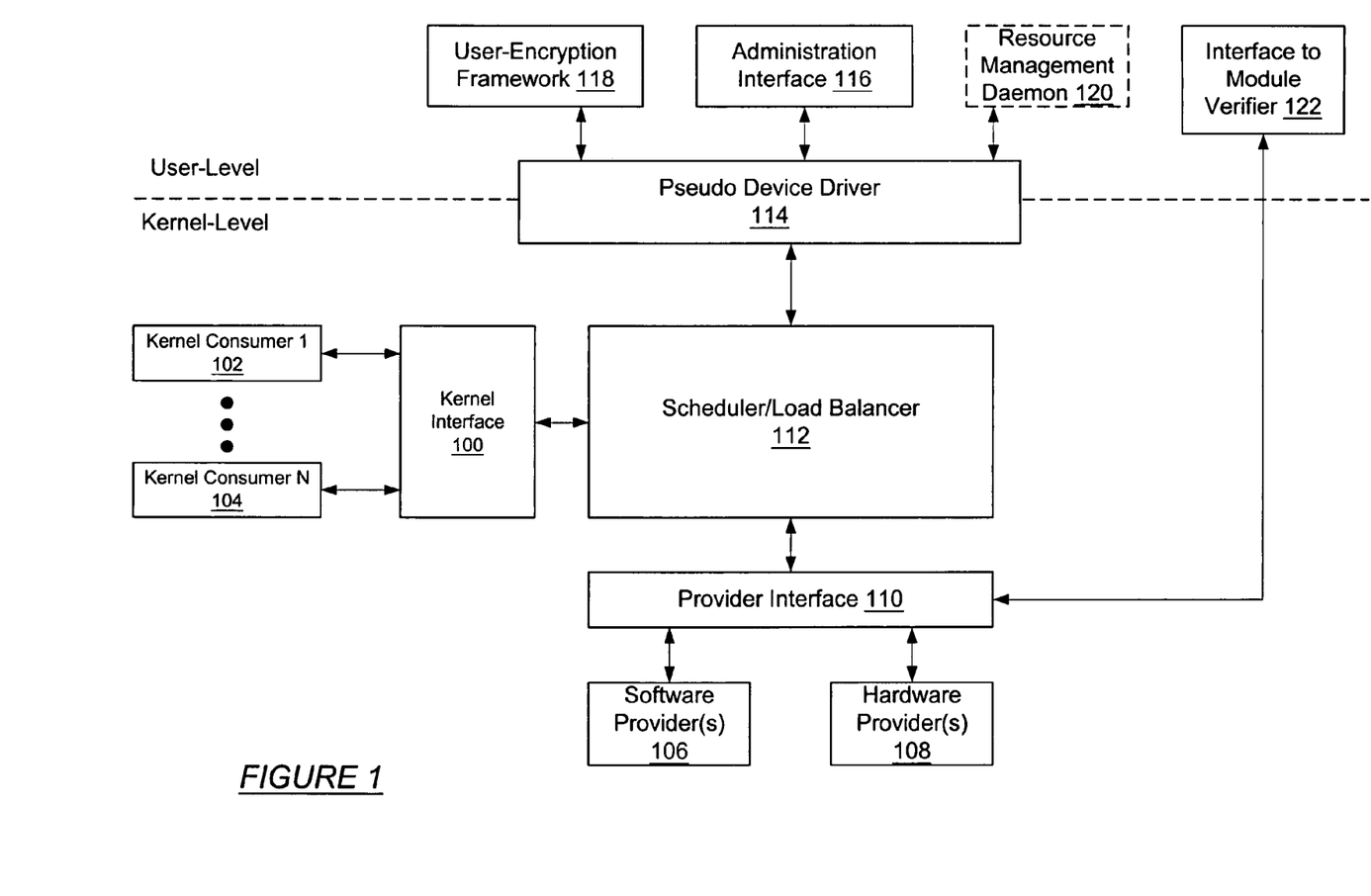
FIG. 1 shows a flow diagram of a cryptographic framework in accordance with one embodiment of the invention.

FIG. 1 shows a flow diagram of a cryptographic framework in accordance with one embodiment of the invention. FIG. 1 shows an embodiment of the encryption framework that includes components that reside on both the user-level and the kernel-level. The encryption framework includes a kernel interface (100) that is configured to provide a common entry point for kernel consumers (e.g., Kernel Consumer 1 (102) and Kernel Consumer N (104)) that require cryptographic services, which are provided by the encryption framework. In one embodiment of the invention, the kernel consumers (102, 104) can operate in both synchronous and asynchronous mode, i.e., the kernel consumers (102, 104) may send synchronous and asynchronous requests to the encryption framework.

In one embodiment of the invention, if the kernel consumer (102, 104) sends a synchronous request to the encryption framework, the kernel consumer (102, 104) that made the request does not receive any response from the encryption framework until the request has been completely processed. Alternatively, if the kernel consumer (102, 104) sends an asynchronous request, the kernel consumer (102, 104) may receive intermediate results about whether or not the request is processed, and how the servicing of the request is proceeding. In addition, the encryption framework typically queues the request when an asynchronous request is received. The encryption framework also includes functionality to notify the kernel consumer (102, 104) that a particular request was queued, or was not queued.

Returning to FIG. 1, in one embodiment of the invention, the request to perform a cryptographic function may be provided to software providers (106) or hardware providers (108), which interface with the encryption framework via a provider interface (110). In one embodiment of the invention, the software provider (106) is a loadable kernel module capable of performing cryptographic functions (i.e., message digest, message authentication code (MAC), signature generation and verification, encryption, decryption, dual-operations routines, etc.). Alternatively, the software provider (106) may be a kernel level library that implements a set of mechanisms. In one embodiment of the invention, the mechanism corresponds to a cryptographic algorithm (e.g., MD5, 3DES, etc.) and the manner in which the algorithm is used (e.g., modes, name, key size, etc.). In addition, the encryption framework may include functionality to load the software providers, as required by the encryption framework (e.g., loaded on demand, etc.).

Further, in one embodiment of the invention, the software providers (106) typically operate in synchronous mode (i.e., software provider (106) does not respond to any requests and return any response to the kernel consumer whose request is currently being processed prior to completing execution of the cryptographic function).

Continuing with FIG. 1, in one embodiment of the invention, the hardware provider (108) interfaces with the encryption framework via the provider interface (110) and offloads the performance overhead from the encryption framework. The hardware provider (108) typically includes the same functionality as the software provider (106) with respect to performing cryptographic functions. However, the hardware provider (108) typically operates in an asynchronous mode (i.e., hardware provider (108) may respond to requests and return responses to the kernel consumer whose request is currently being processed prior to completing execution of the cryptographic function). The provider interface (110) may also interface with a Module Verifier (122). The module verifier (122) checks the integrity and authenticity of a cryptographic provider (e.g., hardware provider (108), a software provider (106), etc.) before adding the particular cryptographic provider to the list of cryptographic mechanism (described below).

As noted above, the kernel consumers (102, 104) may send both asynchronous and synchronous requests. However, the software providers (106) typically operate only in synchronous mode (described above) and the hardware providers (108) typically operate in only asynchronous mode (described above). To enable the kernel consumers (102, 104) to interact with the hardware providers (108) and software providers (106), the encryption framework is configured to schedule the requests received from the kernel consumers (102, 104) such that the requests may be processed by the software providers (106) and the hardware providers (108) regardless of the type of request or the type of cryptographic provider.

In one embodiment of the invention, if the kernel consumer (102, 104) sends an asynchronous request, then the encryption framework places the request on a global software provider queue, which may be serviced by any of the software providers (106), or places the request on a particular hardware provider queue associated with a particular hardware provider (108).

The determination of whether to execute the request using a software provider (106) or a hardware provider (108) is typically performed using information within the request. Specifically, in one embodiment of the invention, the request may include information about the type of mechanism that the kernel consumer (102, 104) requires. This information is used by the encryption framework along with a listing of mechanisms that can be performed by the available software providers (106) and hardware providers (108). The result of the aforementioned determination is then used to place the request on a particular queue. Requests are described in more detail below.

In one embodiment of the invention, the list of mechanisms that can be performed by the available software providers (106) and hardware providers (108) is represented in the encryption framework using a two-dimensional array. Specifically, the two-dimensional array includes a series of arrays of cryptographic providers that can provide particular mechanisms indexed by mechanism. In one embodiment of the invention, each mechanism is identified by a unique mechanism number. The unique mechanism number may be used by the kernel consumer to request a particular mechanism.

In one or more embodiments of the invention, the encryption framework also includes functionality to dynamically add and remove additional mechanisms. Specifically, the encryption framework provides functionality to allow cryptographic providers to publish new mechanisms that the cryptographic providers can support without requiring the encryption framework to be recompiled.

Returning to the discussion of FIG. 1, the kernel consumer (102, 104) also includes functionality to send a synchronous request. When a synchronous request is received, the encryption framework determines whether to place the request in a queue. This determination is made based on whether a software provider (106) or a hardware provider (108) is used to service the request. Embodiments for servicing synchronous and asynchronous requests are described below with reference FIG. 2.

Continuing with FIG. 1, the encryption framework also includes a scheduler/load balancer (112) that manages the global software provider queue and the individual hardware provider queues. Further, the scheduler/load balancer (112) manages service threads, which are used to service the requests in the global software provider queue.

Those skilled in the art will appreciate that while the invention has been described using a global software provider queue, the invention may be implemented using individual software provider queues for each of the software providers (106).

The scheduler/load balancer (112) is operatively connected to a pseudo device driver (114). The pseudo device driver (114), in one embodiment of the invention, provides an interface between the encryption framework and an administration interface (116). The administration interface (116) may include functionality to allow a user to manage the encryption framework via a command line interface (not shown). Further, the administration interface (116) may also include functionality to allow a user to observe particular operations that are occurring within the encryption framework.

The pseudo device driver (114) may also include functionality to interface a user-encryption framework (118) with the encryption framework. Specifically, the pseudo device driver (118) allows the user-encryption framework (118) to access the cryptographic providers (i.e., software providers (106) and hardware providers (108)). In addition, the pseudo device driver (114) may provide an interface between a resource management daemon (120) and the encryption framework. The resource management daemon (120) typically is used to manage resources within the encryption framework.

As noted above, the kernel interface (100), in one or more embodiments of the invention, provides an entry point for kernel consumers (102, 104) into the encryption framework. More specifically, the kernel interface (100) allows the kernel consumer (102, 104) to control certain aspects of the encryption framework. In one or more embodiments of the invention, the kernel consumers (102, 104) control certain aspects of the encryption framework via a request.

In one embodiment of the invention, the request includes a pointer to a cryptographic request structure. The cryptographic request structure specifies the conditions of an asynchronous request. Thus, if the request includes a NULL pointer, as opposed to a pointer to the cryptographic request structure, then the encryption framework treats the request as a synchronous request and processes the request accordingly. Alternatively, if the request includes a non-NULL pointer to a cryptographic request structure, then the encryption framework treats the request as an asynchronous request and processes the request accordingly.

In one embodiment of the invention, the cryptographic request structure includes a CRYPTO_ALWAYS_QUEUE flag, a CRYPTO_NOTIFY_OPDONE flag, and a CRYPTO_SKIP_REQID flag. The CRYPTO_ALWAYS_QUEUE flag, if set, indicates that the request is to be queued. The CRYPTO_NOTIFY_OPDONE, if set, indicates that the encryption framework should notify the kernel consumer when intermediate steps are completed in a multi-part cryptographic operation. Thus, the CRYPTO_NOTIFY_OPDONE function limits the number of times the kernel consumer is notified via a callback function (discussed below). The CRYPTO_SKIP_REQID flag, if set, indicates that the encryption framework should not generate a handle associated with the request once the request is queued.

The cryptographic request structure also includes information necessary to define a callback function and arguments associated with the callback function. The callback function, along with the associated arguments, is used to notify the kernel consumer after intermediate steps within a cryptographic operation, as specified by the request, have been completed and/or after the entire request has been completed. The callback function typically returns a "finished status" to the kernel consumer whenever a notification is sent to the kernel consumer via the callback function. Table 1 shows a list of typical values of the "finished status" below.

TABLE 1

Finish Status Values

| Finished Status | Description |
| --- | --- |
| CRYPTO_SUCCESS | Operation successfully completed. |
| CRYPTO_QUEUED | Operation successfully queued. The callback routine will be called later, when the operation completes. |
| CRYPTO_HOST_MEMORY | Not enough memory to complete the operation. |
| CRYPTO_ARGUMENTS_BAD | Incorrectly formatted arguments. |
| CRYPTO_BUFFER_TOO_SMALL | The specified output buffer is too small. |
| CRYPTO_BUFFER_TOO_BIG. | The input buffer is too big. |
| CRYPTO_INVALID_CONTEXT | The specified context is not valid. |
| CRYPTO_DATA_LEN_RANGE | Invalid data length or range. |
| CRYPTO_ENCRYPTED_DATA_LEN_RANGE | Invalid cipher text length or range |
| CRYPTO_MECHANISM_INVALID | The specified mechanism argument is not valid. |
| CRYPTO_MECHANISM_PARAM_INVALID | The mechanism parameter is not valid. |
| CRYPTO_KEY_SIZE_RANGE | The specified key size is outside the range allowed for the operation. |
| CRYPTO_MECH_NOT_SUPPORTED | Mechanism is not appropriate for function. |
| CRYPTO_BUSY | Not enough system resource to handle a crypto request now. |
| CRYPTO_CANCELED | The request was canceled. |
| CRYPTO_FAILED | Operation failed for any other reason. |

In addition, the cryptographic request structure may include information about whether the kernel consumer is registered to receive notifications from the encryption framework when not enough queue resources exist (i.e., memory to queue the request).

In one embodiment of the invention, the encryption framework uses the information in the cryptographic request structure to internally build a corresponding request structure. Once the encryption framework has completed building the internal request structure, the encryption framework discards the cryptographic request structure, except for the information regarding the callback function and associated arguments. The callback function and associated arguments typically persist until the request has been completed and the kernel consumer has been notified.

In one or more embodiments of the invention, the cryptographic request structure may also include a handle. The handle is provided by the encryption framework if the request is queued, and the CRYPTO_SKIP_REQID flag is not set. The handle is generated by the encryption framework after a particular request has been submitted and is used to identify the request. The handle may be used to subsequently cancel the request prior to servicing the request by one of the cryptographic providers.

Further, the cryptographic request structure may include information about the particular cryptographic function that the kernel consumer is requesting to be performed. In one embodiment of the invention, the cryptographic function may include, but is not limited to, message digest, message authentication code (MAC), signature generation and verification, encryption, decryption, dual-operations routines (e.g., MAC and decryption, MAC and encryption, etc.).

In one embodiment of the invention, a message digest function maps a variable-length message into a fixed length value called hash code. Further, a MAC function is a cryptographic function of both the data to be authenticated and a secret key. The aforementioned MAC function is designed in such a way that, when protected, the MAC function provides an authenticator to the message.

In one embodiment of the invention, when a particular mechanism is requested, the request may include a context template. The context template corresponds to the cryptographic context associated with a single or multipart cryptographic function. The cryptographic context corresponds to state information associated with a single or multipart cryptographic operation. This information may include the mechanism, the keying material, the calling conditions, the cryptographic provider, etc. The cryptographic context is typically allocated at the initialization of the operation. The cryptographic context may be assigned to one cryptographic provider, thereby allowing all steps of a multipart cryptographic function to be handled by the same cryptographic provider.

Thus, if a particular series of requests are using the same context, as typically seen when using symmetric ciphers, a context template can be allocated, initialized, and certain fields pre-computed and subsequently saved by the encryption framework. A kernel consumer can subsequently send a series of requests that pass the context template as an argument. Thus, the encryption framework does not need to store multiple copies of an initialization state of the cryptographic context or spend valuable processor time computing the same initial state of the cryptographic context multiple times. The context template is typically destroyed after the series of requests have been serviced.

Figure 2:
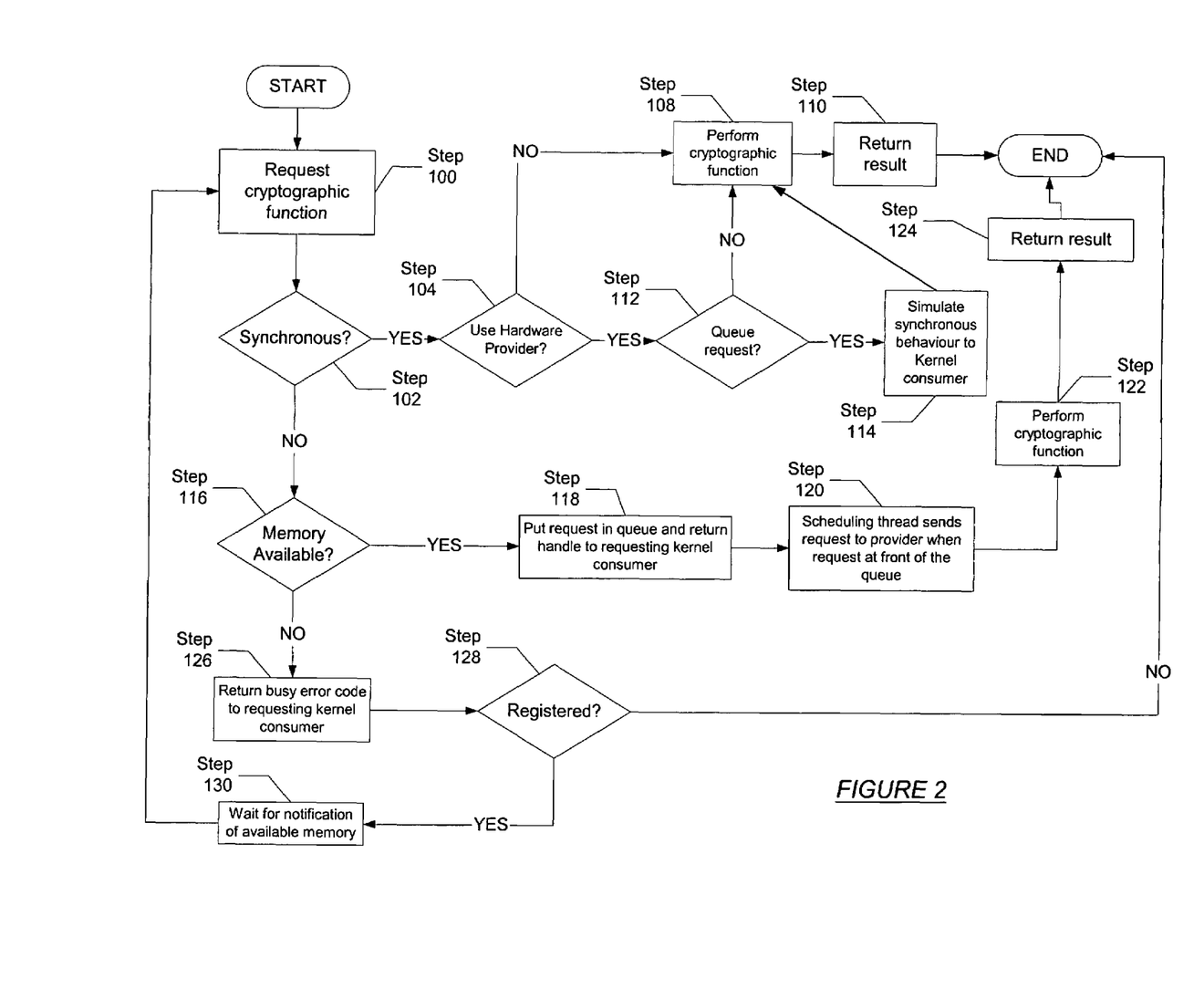
FIG. 2 shows a flow chart in accordance with one embodiment of the invention.

FIG. 2 shows a flowchart in accordance with one embodiment of the invention. More specifically, FIG. 2 shows a flowchart detailing the steps that occur when a request is received by the encryption framework. Initially, a cryptographic request is received by the encryption framework, via the kernel interface (Step 100). If the pointer to a cryptographic request structure, included within the request, is NULL, the request is treated as a synchronous request (Step 102). Alternatively, if the request to the cryptographic request structure is not NULL, the request is treated as an asynchronous request.

If the request is synchronous (as determined in Step 102), then the encryption framework determines whether to use a hardware provider to service the request (Step 104). In one embodiment of the invention, the encryption framework determines whether to use the hardware provider to service the request using the mechanism listed in the request and the list of mechanisms (described above).

If the mechanism is only provided by a hardware provider, then the request is forwarded to a hardware provider for processing. Alternatively, if both a hardware provider and a software provider are present that can provide the mechanism, then the encryption framework may default to using the hardware provider or the software provider (or in some cases have the kernel consumer specify a preference between the hardware provider and the software provider in the request). Alternatively, the request may specify a particular cryptographic provider. As an additional alternative, if a hardware provider and a software provider are present that can provide the mechanism, then as a default the request is forwarded to the hardware provider. If no hardware providers are available to service the request, the request is forwarded to the software provider.

Referring still to FIG. 2, if the encryption framework determines that the software provider is to service the request, then the thread executing the kernel consumer attempts to service the request using the kernel provider (Step 108). More specifically, because the request is serviced in the same context as the kernel consumer (i.e., no context switch occurs), the thread executing the kernel consumer attempts to service the request via the software provider. Thus, the thread enters the encryption framework and waits until it has control of the processor (based on scheduling governed by the kernel). Once the thread has control of the processor, the thread then attempts to service the request using the software provider.

If the software provider is able to perform the cryptographic function in the request during the time the thread has control over the processor, then a result is forwarded to the kernel consumer (Step 110). Alternatively, if the request cannot be completed during the time the thread has control over the processor, then the thread maintains the intermediate results and waits until it has control over the processor again. The aforementioned process is repeated until the entire cryptographic function specified in the request is performed (not shown). Only after the entire request has been completed are the results sent back to the kernel consumer (Step 110).

If the encryption framework determines that the hardware provider is to process the request (Step 104), then the encryption framework determines whether the request needs to be queued (Step 112). This determination is made based on whether requests are currently pending in the queue associated with the hardware provider. If the request does not need to be queued, then the encryption framework submits the request to the hardware provider. The hardware provider subsequently performs the cryptographic function, as specified in the request (Step 108) and returns the result to the kernel consumer (110). In this scenario, no context switching is required (i.e., the effect of using the hardware provider to service a synchronous request when no queue exists is the same as using a software provider to service the synchronous request).

Alternatively, if a request is pending in the queue of the hardware provider, the synchronous request must be queued (Step 112). As noted above, the hardware providers typically operate in an asynchronous manner, thus if synchronous request is placed on a queue, then the thread executing the synchronous request is blocked until the synchronous request is processed by the hardware provider (Step 114). In this manner, the encryption framework simulates the synchronous behavior that is expected by the kernel consumer.

If the thread executing the synchronous request is not blocked when the request is put on the hardware queue (thereby, resulting in a context switch as the hardware provider would then be able to service the request independently of the thread that provided the request), then the thread executing the synchronous request is able to respond to other requests from kernel consumers while waiting for the synchronous request to be serviced by the hardware provider. However, this behavior is not expected by the kernel consumer and, thus, must be prevented when servicing synchronous requests.

Referring still to FIG. 2, once the hardware provider is ready to service the synchronous request, the hardware provider performs the cryptographic function (Step 108) and returns the results to the kernel consumer (Step 110). Specifically, the thread executing the synchronous request is unblocked and subsequently forwards the results provided by the hardware provider to the kernel consumer.

If the request is asynchronous (i.e., the pointer to the cryptographic request structure is not NULL) (Step 102), then the encryption framework determines whether to use a hardware provider or a software provider to service the asynchronous request. As noted above, the encryption framework uses the mechanism listed in the request (along with the list of mechanisms in the encryption framework) to determine whether a hardware provider or a software provider is to service the asynchronous request.

If a software provider is used to service the request, then encryption framework attempts to place the asynchronous request on a software provider queue (typically a global software provider queue). Alternatively, if a hardware provider is used to service the request, then encryption framework attempts to place the asynchronous request on a hardware provider queue (typically associated with a given hardware provider). In attempting to queue the request, the encryption framework determines whether the queue (hardware provider queue or software provider queue) has sufficient queue resources (i.e., memory) to queue the request (Step 116).

If there are sufficient queue resources in the queue, then the asynchronous request is queued, and, if the CRYPTO_SKIP_REQID is not set, a handle identifying the request is returned to the kernel consumer (Step 118). Scheduling threads within the encryption framework send the request to the cryptographic provider (hardware provider or software provider) when the request is at the front of the queue (Step 120). The cryptographic provider (hardware provider or software provider) then performs the cryptographic function requested by kernel consumer, via the mechanism in the request (Step 122), and returns the result to the kernel consumer (Step 124). In one embodiment of the invention, the results are returned to the kernel consumer by invoking a callback function which may, for example, be specified in the cryptographic request structure.

If sufficient queuing resources (i.e., memory) are not available to queue the request (Step 116), then the encryption framework returns a busy error code to the requesting kernel consumer (Step 126). In addition, if the kernel consumer has registered for notifications with the encryption framework (Step 128), then the encryption framework monitors the queue resources and notifies the kernel consumer when sufficient queue resources are available to queue the request (Step 130). In one embodiment of the invention, the kernel consumers' register to be notified when they are initialized, or, alternatively, prior to sending the request to the encryption framework. Further, in one embodiment of the invention, the kernel consumer is notified using a buffer call mechanism.

Alternatively, if the kernel consumer is not registered to receive notifications (Step 128), then the kernel consumer continues executing and may at some later time attempt to send another request. If the kernel consumer does not register to receive notifications, the process terminates, however, the kernel consumer typically includes functionality to recover from a failed request.

In one embodiment of the invention, a kernel consumer may send an asynchronous request and, via the cryptographic request structure, indicate that the request does not need to be queued. When the encryption framework receives such a request, the encryption framework attempts to service the request without placing the request in a queue (either hardware or software). If servicing the request without placing the request in a queue is possible, then the request is serviced and the results returned to the kernel consumer. Alternatively, if the request cannot be serviced without placing the request in a queue, the request is placed in a queue and the kernel consumer is notified accordingly. As an alternative to queuing the request, a notification may be sent back to the kernel consumer indicating that the request cannot be serviced without queuing the request. At this stage, the kernel consumer may then have an option to either to submit an asynchronous request and have the asynchronous request queued or re-submit the asynchronous request without queuing at a later time.

In one embodiment of the invention, the asynchronous requests are called from an interrupt context. Thus, a thread executing the kernel consumer triggers an interrupt, which temporarily preempts the execution of other threads running on that particular CPU while the interrupt handler calls into the encryption framework to queue the request. If the request is queued, the interrupt handler returns from the interrupt and transfers control back to the thread executing the kernel consumer.

Once the cryptographic function specified in the request has been performed, the result is forwarded to the kernel consumer. If the request is not queued, then the interrupt handler returns a message to the kernel consumer indicating that the request was not queued. Then, the thread executing the kernel consumer continues executing the kernel consumer and waits for a notification from the encryption framework that the sufficient queue resources are available or continues recovering from the failed request.

Figure 3:
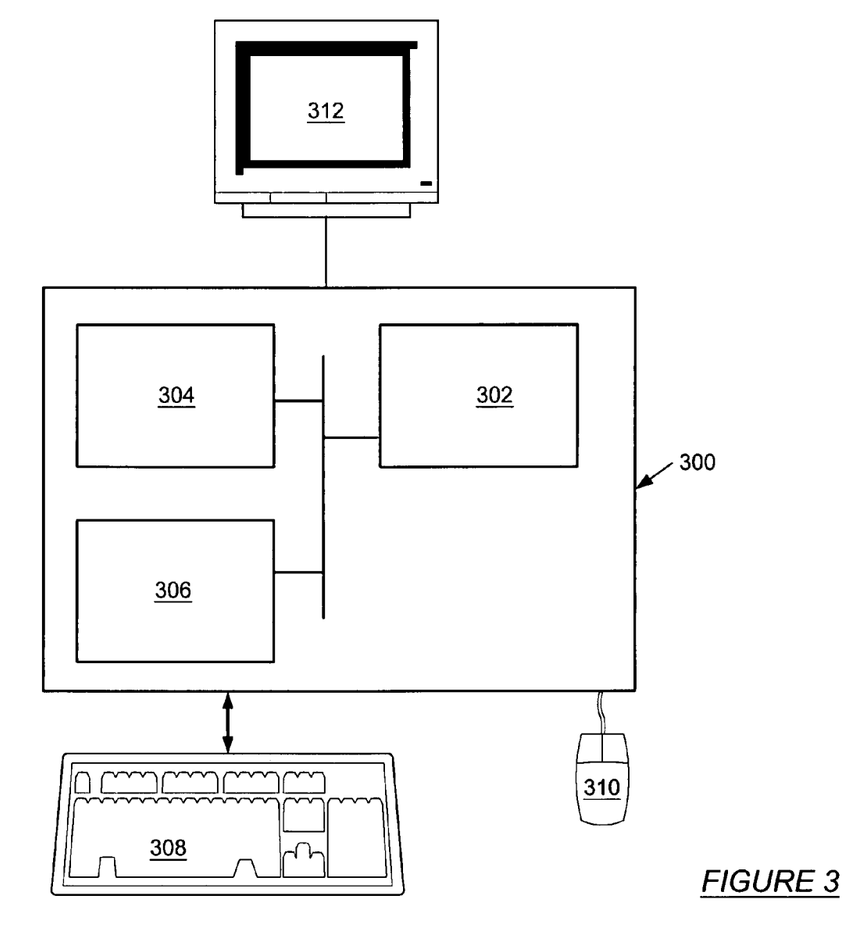
FIG. 3 shows a computer system in accordance with one embodiment of the invention.

The invention may be implemented on virtually any type of computer regardless of the platform being used. For example, as shown in FIG. 3, a networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a local area network (LAN) or a wide area network (e.g., the Internet) (not shown) via a network interface connection. Those skilled in the art will appreciate that these input and output means may take other forms. Further, those skilled in the art will appreciate that one or more elements of the aforementioned computer (300) may be located at a remote location and connected to the other elements over a network. Those skilled in the art will also appreciate that if the invention is implemented on a plurality of nodes, that each component of the invention may be implemented on a separate node, or combinations of components may be implemented on separate nodes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a cryptographic function comprising:

calling into an encryption framework to perform the cryptographic function, wherein calling into the encryption framework comprises sending a request to perform the cryptographic function from a kernel consumer; and processing the request and returning the result to the kernel consumer, wherein processing the request comprises determining whether the request is synchronous or asynchronous, and determining which cryptographic provider to use to perform the cryptographic function, wherein processing the request comprises:

performing the cryptographic function in a kernel consumer context when the request is synchronous;

queuing the request when the request is asynchronous and the kernel consumer indicated to queue the request;

queuing the request when the request is asynchronous and the kernel consumer indicated not to queue the request, and the request needs to be queued;

performing the cryptographic function and returning the result to the kernel consumer after a period of time when the request was queued; and performing the cryptographic function and returning the result to the request to the kernel consumer when the request is asynchronous, the kernel consumer indicated not to queue the request, and the request does not need to be queued.

2. The method of claim 1, wherein queuing the request comprises:

determining whether queue resources are available to queue the request;

notifying the kernel consumer that the request has been successfully queued when queue resources are available; and notifying the kernel consumer that the request to queue has failed when no queue resources are available and the request is asynchronous, wherein the kernel customer is one selected from a group consisting of:

notified, and not notified that the request to the queue has failed when no queue resources are available and the request is synchronous.

3. The method of claim 2, wherein queuing the request further comprises:

when the request is asynchronous, registering the kernel consumer to receive a notification when queue resources are available; and re-submitting the request by the kernel consumer when the notification is received, wherein when the request is synchronous, the kernel customer is one selected from the group consisting of:

registered, and not registered to receive a notification when the queue resources are available.

4. The method of claim 1, wherein the cryptographic provider comprises at least one selected from the group consisting of a hardware provider and a software provider.

5. The method of claim 4, wherein the hardware provider is associated with a hardware provider queue and the software provider is associated with a software provider queue.

6. The method of claim 4, wherein the request is performed in an interrupt context when the request is asynchronous.

7. The method of claim 1, wherein the encryption framework is located in a kernel and comprises a kernel interface configured to interface between the encryption framework and the kernel consumer, and a provider interface configured to interface between the cryptographic provider and the kernel interface.

8. A method for performing a cryptographic function comprising:
obtaining a request from a kernel consumer by a kernel;
performing the cryptographic function in a kernel consumer context when the request is synchronous;
queuing the request when the request is asynchronous and the kernel consumer indicated to queue the request;
queuing the request when the request is asynchronous and the kernel consumer indicated not to queue the request, and the request needs to be queued;
performing the cryptographic function and returning the result to the kernel consumer after a period of time when the request was queued; and
performing the cryptographic function and returning the result to the request to the kernel consumer when the request is asynchronous, the kernel consumer indicated not to queue the request, and the request does not need to be queued.

9. The method of claim 8, wherein a cryptographic provider performs the cryptographic function.

10. The method of claim 9, wherein the cryptographic provider comprises at least one selected from the group consisting of a hardware provider and a software provider.

11. The method of claim 10, further comprising:
queuing the request when the request is synchronous and the hardware provider is required to perform the cryptographic function.

12. The method of claim 10, wherein the hardware provider is associated with a hardware provider queue and the software provider is associated with a software provider queue.

13. The method of claim 8, wherein queuing the request comprises:
determining whether queue resources are available to queue the request;
notifying the kernel consumer that the request has been successfully queued when queue resources are available; and
notifying the kernel consumer that the request to queue has failed when no queue resources are available and the request is asynchronous,
wherein the kernel customer is one selected from a group consisting of:
notified, and
not notified that the request to the queue has failed when no queue resources are available and the request is synchronous.

14. The method of claim 13, wherein queuing the request further comprises:
when the request is asynchronous,
registering the kernel consumer to receive a notification when queue resources are available; and
re-submitting the request by the kernel consumer when the notification is received,
wherein when the request is synchronous, the kernel customer is one selected from the group consisting of:
registered, and
not registered to receive a notification when the queue resources are available.

15. The method of claim 8, wherein queuing the request further comprises:
returning a handle associated with the request to the kernel consumer when queuing the request is successful and the handle is requested by the kernel consumer.

16. The method of claim 15, further comprising:
canceling the request using the handle.

17. The method of claim 8, wherein performing the cryptographic function comprises generating a context template associated with the request.

18. The method of claim 17, wherein generating the context template comprises:
allocating memory in the kernel for the context template;
initializing the context template;
computing portions of the context template to obtain computed portions; and
storing the context template with the computed portions.

19. The method of claim 17, wherein the context template is destroyed after all operations specified in the request associated with the context template are completed.

20. The method of claim 8, wherein the request is a part of a multipart operation.

21. The method of claim 8, wherein the period of time is related to an amount of time the request remains in a queue associated with the cryptographic provider.

22. The method of claim 8, wherein the cryptographic function comprises at least one selected from the group consisting of generating a message digest, generating a message authentication code, signature generation and verification, encryption, decryption, and dual-operation routines.

23. The method of claim 22, wherein dual-operation routines comprise at least one selected from the group consisting of encryption and generating a message authentication code and generating the message authentication code and decryption.

24. The method of claim 8, wherein the cryptographic function is performed in a plurality of sub-operations.

25. The method of claim 8, wherein the request comprises a cryptographic mechanism.

26. The method of claim 25, further comprising:
loading the cryptographic provider including the cryptographic mechanism.

27. The method of claim 8, wherein the request is performed in an interrupt context when the request is asynchronous.

28. A computer system for performing a cryptographic function, comprising:
a processor;
a kernel consumer executing on the processor and configured to request the cryptographic function, and
a kernel executing on the processor and comprising:
a cryptographic provider configured to perform the cryptographic function, and
an encryption framework comprising:
a kernel interface configured to interface between the encryption framework and the kernel consumer, and
a provider interface configured to interface between the cryptographic provider and the kernel interface, wherein the encryption framework is configured to receive and schedule synchronous and asynchronous requests from the kernel consumer;

wherein the encryption framework is configured to process the request and returning the result to the kernel consumer, wherein processing the request comprises:

performing the cryptographic function in a kernel consumer context when the request is synchronous;

queuing the request when the request is asynchronous and the kernel consumer indicated to queue the request;

queuing the request when the request is asynchronous and the kernel consumer indicated not to queue the request, and the request needs to be queued;

performing the cryptographic function and returning the result to the kernel consumer after a period of time when the request was queued; and performing the cryptographic function and returning the result to the request to the kernel consumer when the request is asynchronous, the kernel consumer indicated not to queue the request, and the request does not need to be queued.

29. The computer system of claim 28, wherein the encryption framework is configured to return a handle to the kernel consumer when the request is queued, wherein the encryption framework is not configured to return a handle to the kernel consumer when the request is not queued.

30. The computer system of claim 29, wherein the kernel consumer may cancel the request using the handle.

31. The computer system of claim 28, wherein the encryption framework is configured to notify the kernel consumer when queue resources are not available.

32. The computer system of claim 28, wherein the encryption framework is configured to register the kernel consumer such that the kernel consumer is notified when queue resources are available.

33. The computer system of claim 28, wherein the cryptographic provider comprises at least one selected from the group consisting of a hardware provider and a software provider.

34. The computer system of claim 33, wherein the encryption framework further comprises:

a hardware provider queue associated with the hardware provider; and a software provider queue associated with the software provider.

35. The computer system of claim 28, wherein the kernel interface is configured to notify the kernel consumer when the cryptographic provider has completed performing the cryptographic function.

36. The computer system of claim 28, wherein the encryption framework is configured to generate a context template, wherein the context template is associated with the request.

37. The computer system of claim 36, wherein the encryption framework is configured to initialize and compute portions of the context template.

38. The computer system of claim 28, wherein the request comprises a cryptographic mechanism.

39. The computer system of claim 28, wherein the encryption framework further comprises a list of cryptographic mechanisms provided by the cryptographic provider.

40. The computer system of claim 39, wherein the encryption framework is configured to load the cryptographic provider into the kernel using the list of cryptographic mechanisms and a cryptographic mechanism in the request.

41. The computer system of claim 28, wherein the encryption framework comprises functionality to dynamically add a mechanism.

42. The computer system of claim 28, wherein the encryption framework comprises functionality to dynamically remove a mechanism.

43. A computer system for performing a plurality of cryptographic functions in a kernel, comprising:

a processor;

a kernel consumer executing on the processor and configured to request one of the plurality of cryptographic functions;

a plurality of cryptographic providers executing on the processor and each configured to perform at least one of the plurality of cryptographic functions; and an encryption framework executing on the processor and comprising:

a kernel interface configured to interface between the encryption framework and the kernel consumer; and a provider interface configured to interface between the plurality of cryptographic providers and the kernel interface, wherein the encryption framework is configured to receive and schedule synchronous and asynchronous requests from the kernel consumer;

wherein the encryption framework is configured to process the request and returning the result to the kernel consumer, wherein processing the request comprises:

performing the cryptographic function in a kernel consumer context when the request is synchronous;

queuing the request when the request is asynchronous and the kernel consumer indicated to queue the request;

queuing the request when the request is asynchronous and the kernel consumer indicated not to queue the request, and the request needs to be queued;

performing the cryptographic function and returning the result to the kernel consumer after a period of time when the request was queued; and performing the cryptographic function and returning the result to the request to the kernel consumer when the request is asynchronous, the kernel consumer indicated not to queue the request, and the request does not need to be queued.

44. The computer system of claim 43, wherein the plurality of cryptographic providers comprises at least one selected from the group consisting of a hardware provider and a software provider.

45. The computer system of claim 44, wherein the plurality of cryptographic providers comprises a plurality of hardware providers and a plurality of software providers.

46. The computer system of claim 45, wherein the encryption framework further comprises a plurality of hardware provider queues, wherein each of the plurality of hardware provider queues is associated with one of the plurality of hardware providers.

47. The computer system of claim 45, wherein the encryption framework further comprises a software provider queue associated with the plurality of software providers.

48. The computer system of claim 43, wherein the kernel interface is configured to notify the kernel consumer when one of the plurality of cryptographic providers has completed performing the cryptographic function.

49. The computer system of claim 43, wherein the encryption framework is configured to initialize and compute portions of a context template.

50. The computer system of claim 43, wherein the request comprises a cryptographic mechanism.

51. The computer system of claim 43, wherein the encryption framework further comprises a list of cryptographic mechanisms provided by each of the plurality of cryptographic providers.

52. The computer system of claim 51, wherein the encryption framework is configured to load at least one of the plurality of cryptographic provider into the kernel based on the list of cryptographic mechanisms and a cryptographic mechanism in the request.

53. The computer system of claim 43, wherein the encryption framework comprises functionality to dynamically add a mechanism.

54. The computer system of claim 43, wherein the encryption framework further comprises functionality to dynamically remove a mechanism.

55. A network system having a plurality of nodes, comprising:
- a kernel consumer configured to request a cryptographic function;
- a kernel comprising:
  - a cryptographic provider configured to perform the cryptographic function; and
  - an encryption framework comprising:
    - a kernel interface configured to interface between the encryption framework and the kernel consumer; and
    - a provider interface operatively connected to the kernel interface configured to interface between the cryptographic provider and the kernel interface;
  - wherein the encryption framework is configured to receive and schedule synchronous and asynchronous requests from the kernel consumer;
  - wherein the encryption framework is configured to process the request and returning the result to the kernel consumer, wherein processing the request comprises:
    - performing the cryptographic function in a kernel consumer context when the request is synchronous;
    - queuing the request when the request is asynchronous and the kernel consumer indicated to queue the request;
    - queuing the request when the request is asynchronous and the kernel consumer indicated not to queue the request, and the request needs to be queued;
    - performing the cryptographic function and returning the result to the kernel consumer after a period of time when the request was queued; and
  - performing the cryptographic function and returning the result to the request to the kernel consumer when the request is asynchronous, the kernel consumer indicated not to queue the request, and the request does not need to be queued,
- wherein the kernel consumer executes on any node of the plurality of nodes,
- wherein the cryptographic provider executes on any node of the plurality of nodes,
- wherein the provider interface executes on any of the plurality of nodes, and
- wherein the kernel interface executes on any node of the plurality of nodes.

* * * * *